United States Patent

Syori et al.

Patent Number: 5,800,646
Date of Patent: Sep. 1, 1998

[54] METHOD AND APPARATUS FOR MANIPULATING FILM

[75] Inventors: Hideichi Syori; Shigeru Maeda; Tomoyuki Morishita; Tatsuya Hane, all of Matsusaka, Japan

[73] Assignee: Central Glass Company, Limited, Ube, Japan

[21] Appl. No.: 895,689

[22] Filed: Jul. 17, 1997

Related U.S. Application Data

[63] Continuation of Ser. No. 359,386, Dec. 20, 1994, abandoned.

[30] Foreign Application Priority Data

| Dec. 21, 1993 | [JP] | Japan | 5-322596 |
| Dec. 21, 1993 | [JP] | Japan | 5-322597 |
| Dec. 27, 1993 | [JP] | Japan | 5-333114 |
| Dec. 27, 1993 | [JP] | Japan | 5-333115 |

[51] Int. Cl.$^6$ .............................. B32B 31/04
[52] U.S. Cl. ............ 156/64; 156/100; 156/106; 156/362; 156/379; 156/571
[58] Field of Search .............. 156/100, 106, 156/64, 344, 362, 379, 571; 271/91, 104; 414/754, 797; 901/47

[56] References Cited

U.S. PATENT DOCUMENTS

| 3,106,391 | 10/1963 | Dew | 271/91 |
| 4,328,553 | 5/1982 | Fredriksen et al. | 414/754 X |
| 4,397,976 | 8/1983 | Mori et al. | 156/106 X |
| 5,350,166 | 9/1994 | Shimizu et al. | 271/91 X |

FOREIGN PATENT DOCUMENTS

| 0111739 | 6/1984 | European Pat. Off. . |
| 0287861 | 10/1988 | European Pat. Off. . |
| 0319251 | 6/1989 | European Pat. Off. . |
| 52-144 | 1/1977 | Japan . |
| 54-18028 | 7/1979 | Japan . |
| 55-11878 | 3/1980 | Japan . |
| 60-73532 | 4/1985 | Japan . |
| 1-145945 | 6/1989 | Japan . |
| 2-500104 | 1/1990 | Japan . |
| 2-83180 | 3/1990 | Japan . |
| 3-293237 | 12/1991 | Japan . |
| 4-105890 | 4/1992 | Japan . |
| 5-19496 | 3/1993 | Japan . |
| 5-44375 | 11/1993 | Japan . |
| 774878 | 5/1957 | United Kingdom | 271/104 |

OTHER PUBLICATIONS

"Humidity Conditioning Essential to Safety Glass Manufacture", G.A. Kelley, *The Glass Industry*, Jan. 1953.

*Primary Examiner*—Janice L. Krizek
*Attorney, Agent, or Firm*—Evenson, McKeown, Edwards & Lenahan, PLLC

[57] ABSTRACT

In releasing a film from stacked films and transporting it to a predetermined position, film suction devices hold the film at two opposite peripheral portions. The suction devices are then lifted together with the film so that the lifted portions approach a center of the film. Ends of the lifted portions is grasped by finger portions while the other films are pressured by a pressing mechanism. The film is further lifted to be released from the other films. The film is then transported and accurately put on a predetermined portion.

11 Claims, 23 Drawing Sheets

METHOD AND APPARATUS FOR MANIPULATING FILM

This is a continuation of application Ser. No. 08/359,386, filed Dec. 20, 1994, abandoned.

BACKGROUND OF THE INVENTION

1. Field of the Invention

The present invention relates to a method and apparatus for manipulating a film of stacked films, and more particularly to a method and apparatus which functions effectively when it is applied to stacked films which tend to block a release of a film from others.

2. Description of the Prior Art

Various apparatuses for manipulating a film of stacked films have been proposed. For example, Japanese Patent Publication No. 54-18028 discloses a film handling apparatus which has a pair of arms having high-friction end surfaces. A film suction device is disposed outside of each of the arms and applied to an end portion of a film of stacked films. The arms are contacted with and sandwich the film. The end portions of the film are then lifted by the pair of film suction devices.

Japanese Utility Model Publication No. 52-144 discloses a film suction device which has a bottom suction surface and a peripheral suction surface continuous to the bottom suction surface. The peripheral suction surface is upwardly oblique toward an outside of the suction device. Therefore, a film of a first order in stacked films is attached to the film suction device so that peripheral portions of the film are separated form the other films.

Japanese Utility Model Publication No. 55-11878 discloses a film suction device where a pair of chucking devices holds two end portions of a film of stacked films. Each chucking device is rotated on an axis parallel to a film surface so as to separated the chucked peripheral portions of the film from the others.

Japanese Patent Provisional Publication No. 1-145945 discloses a film manipulating apparatus where a film releasing unit having a plurality of needles separates a film of stacked films from the other films by sticking its needles to the film.

Japanese Patent Publication No. 5-19496 discloses a film installation apparatus which puts a film on an upper surface of a curved glass sheet. This apparatus includes a pair of wrinkle stretching devices which stretches wrinkles of the film and puts the film on the curved glass sheet.

However, each of these apparatuses has a drawback, such as, it is difficult to be applicable to various types of films, such as a film which changes its properties according to a temperature and a humidity, by one apparatus, or it may injure a film during a manipulating operation.

SUMMARY OF THE INVENTION

It is an object of the present invention to provide a readily automatable method for securely and effectively releasing a film from stacked films one by one and transporting it to a predetermined position.

It is another object of the invention to provide a film manipulating apparatus for performing the method according to the invention.

A first aspect of the present invention is a method which comprises the steps of attaching suction devices to at least two opposite peripheral portions of the film, lifting the suction devices so that the lifted portions approach a center of the film, grasping the lifted end portions of the film, pressuring the other films, further lifting the film to release the film from the other films, and transporting and putting the film on a predetermined portion.

Another aspect of the present invention is a film manipulating apparatus which comprises a suction mechanism sucking at least two opposite peripheral portions of a film of a plurality of stacked films, a partial release mechanism lifting the peripheral portions of the film so that the lifted portions approach a center of the film, a grasping mechanism grasping the lifted end portions of the film, an elevating mechanism lifting and lowering the suction mechanism, the partial release mechanism and the grasping mechanism, and a transporting mechanism reciprocatingly transporting the elevating mechanism between two predetermined positions.

DETAILED DESCRIPTION OF THE INVENTION

Referring to FIGS. 1 to 26C, there is shown a first embodiment of a film manipulating technique and apparatus according to the present invention.

Figure 1:
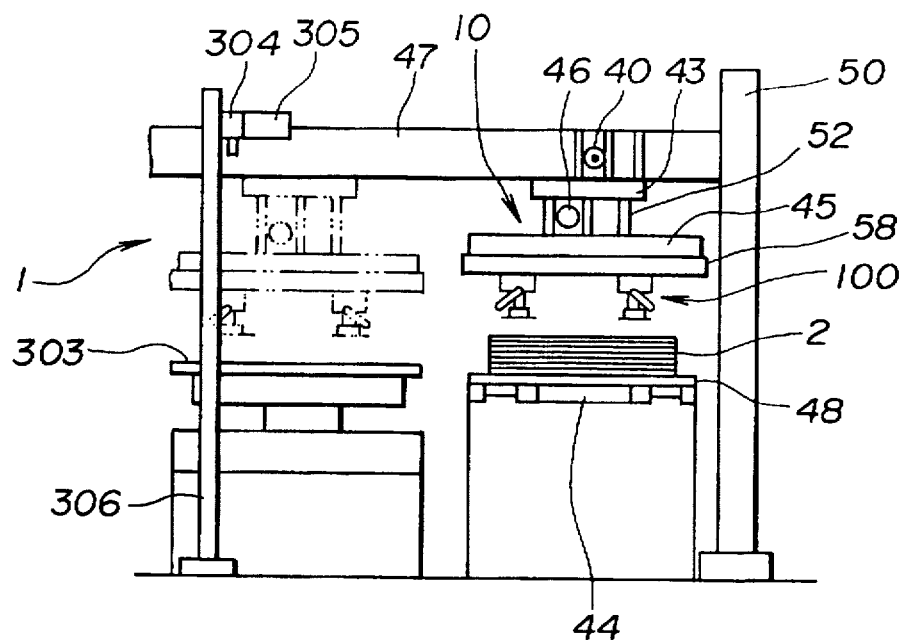
FIG. 1 is a side view which shows a first embodiment of a film manipulating apparatus according to the present invention.
Figure 2:
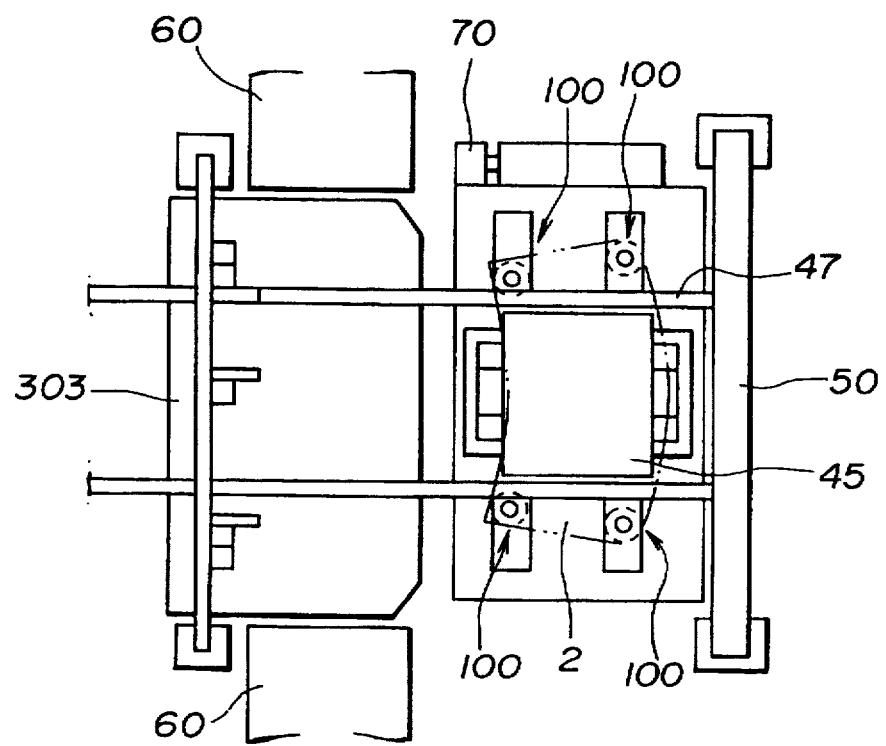
FIG. 2 is a top view of the film manipulating apparatus of FIG. 1.

As shown in FIGS. 1 and 2, the film manipulating apparatus 1 is installed in a conveyer-line system 60. The film manipulating apparatus 1 manipulates stacked films 2 made of synthetic resin in an air-conditioned circumstance. The film manipulating apparatus 1 comprises a film handling device 10 including a pair of film releasing devices 100, 100. The film handling device 10 is installed to a pair of slide frames 47, 47 through slide gears 43 and a first motor 40 so as to be horizontally slidable along the slide frames 47, 47 according to the operation of the first motor 40. The pair of slide frames 47, 47 are fixedly supported by a pair of support members 50, 50 (although one of them is not shown in FIG.) The film releasing devices 100, 100 are installed on an installation plate 58 so as to be located at portions corresponding to opposite corners of a film 2 to be handled. The installation plate 58 is integrally connected with a support plate 45. The support plate 45 is installed to the slide frames 47, 47 through vertically moving guides 52 and a second motor 46 so as to vertically move the film handling device 10. A plurality of films 2 of a sector shape are piled up (or stacked) on a table 48 which is movable on a transport roller 44. The film 2 is a glass sheet or glass film whose thickness is smaller than 1.5 mm. The table 48 is moved by the motor unit 70 through the transport roller 44. A plurality of cameras 304 for monitoring a position of the film 2 on a table 303 are installed to a stand 306 through adjusters 305. Furthermore, the film manipulating apparatus 1 comprises a conditioner (not shown) which controls the temperature and/or humidity of this apparatus in a predetermined condition, such as in a condition that a temperature is controlled within a range of 10° to 25° C., more strictly within 13° to 18° C.

Figure 3:
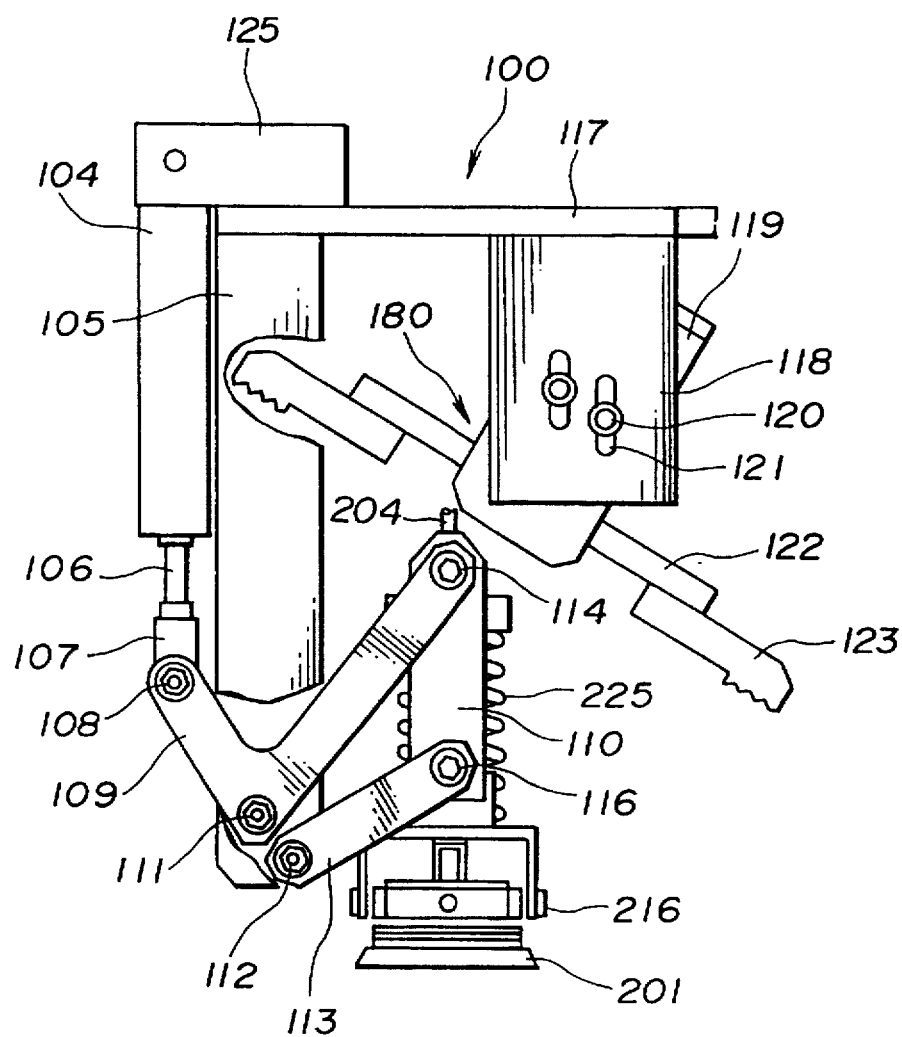
FIG. 3 is a side view, partially in cross-section, of a film releasing device applied to the film manipulating apparatus of FIG. 1.
Figure 4:
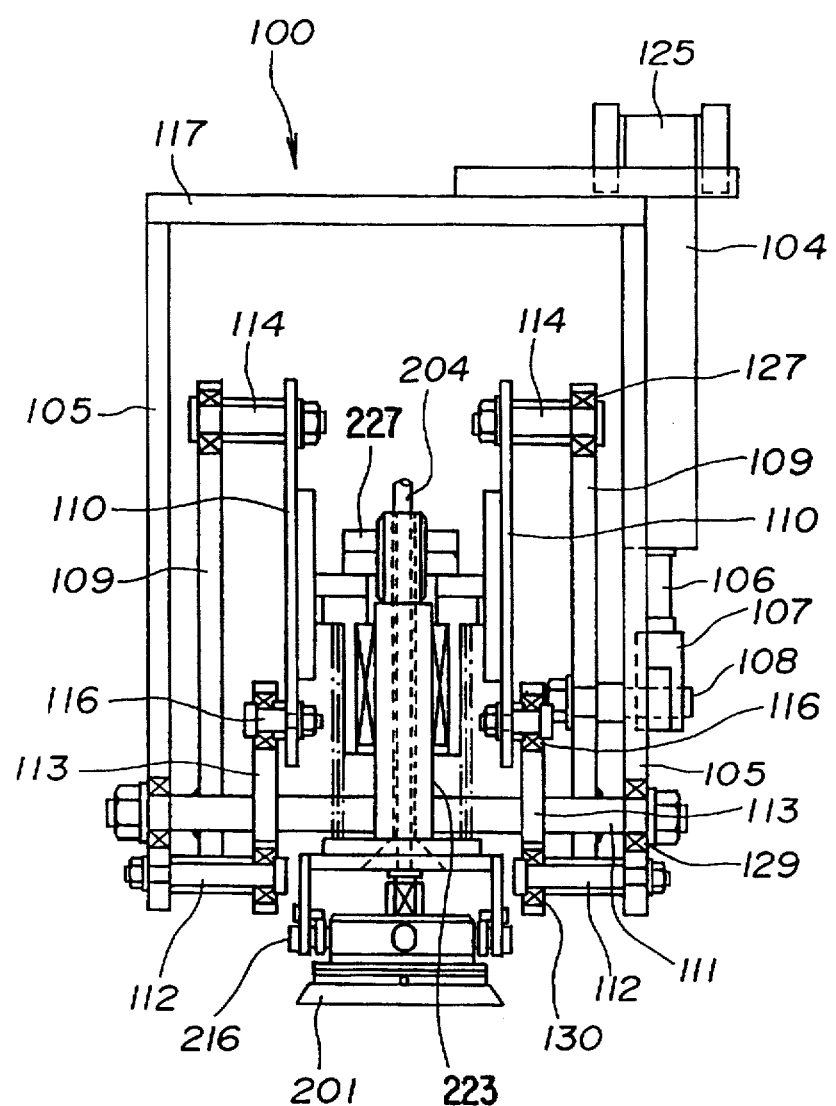
FIG. 4 is a front view of the film releasing device of FIG. 3.

As shown in FIGS. 3 and 4, each film releasing device 100 comprises a pair of vertical support members 105, 105 and an upper support member 117 which is integrally connected to the vertical support members 105, 105. An installation bracket 125 for connecting the film releasing device 100 to the installation plate 58 is fixedly connected to the upper support member 117. An end of a first air cylinder 104 is swingably connected to the installation bracket 125. A rod end member 107 is connected to the other end of the first air cylinder 104 through a piston rod 106. A first link 109 of a V-shape is rotatably connected to the vertical support member 105 through a bearing 129 and a first shaft 111. An end portion of the V-shaped first link 109 is rotatably connected to the rod end portion 107 through a second shaft 108. The other end of the V-shaped first link 109 is rotatably connected to an upper portion of a second link 110 through a bearing 127 and a third shaft 114. An end portion of a third link 113 is rotatably connected to a lower end portion of the vertical support member 105 through a bearing 130 and a fourth shaft 112. The other end portion of the third link 113 is rotatably connected to the other end portion of the second link 110 through a fifth shaft 116. An installation member 118 for installing a grasping mechanism 180 is fixedly connected to the upper support member 117. The installation member 118 has two slots 121, 121 to which a chucking cylinder 119 is adjustably installed by means of bolts 120, 120. A pair of finger portions 123, 123 for grasping the film 2 are fixed to a pair of chucking portions 122 of the chucking cylinder 119, respectively.

Figure 5:
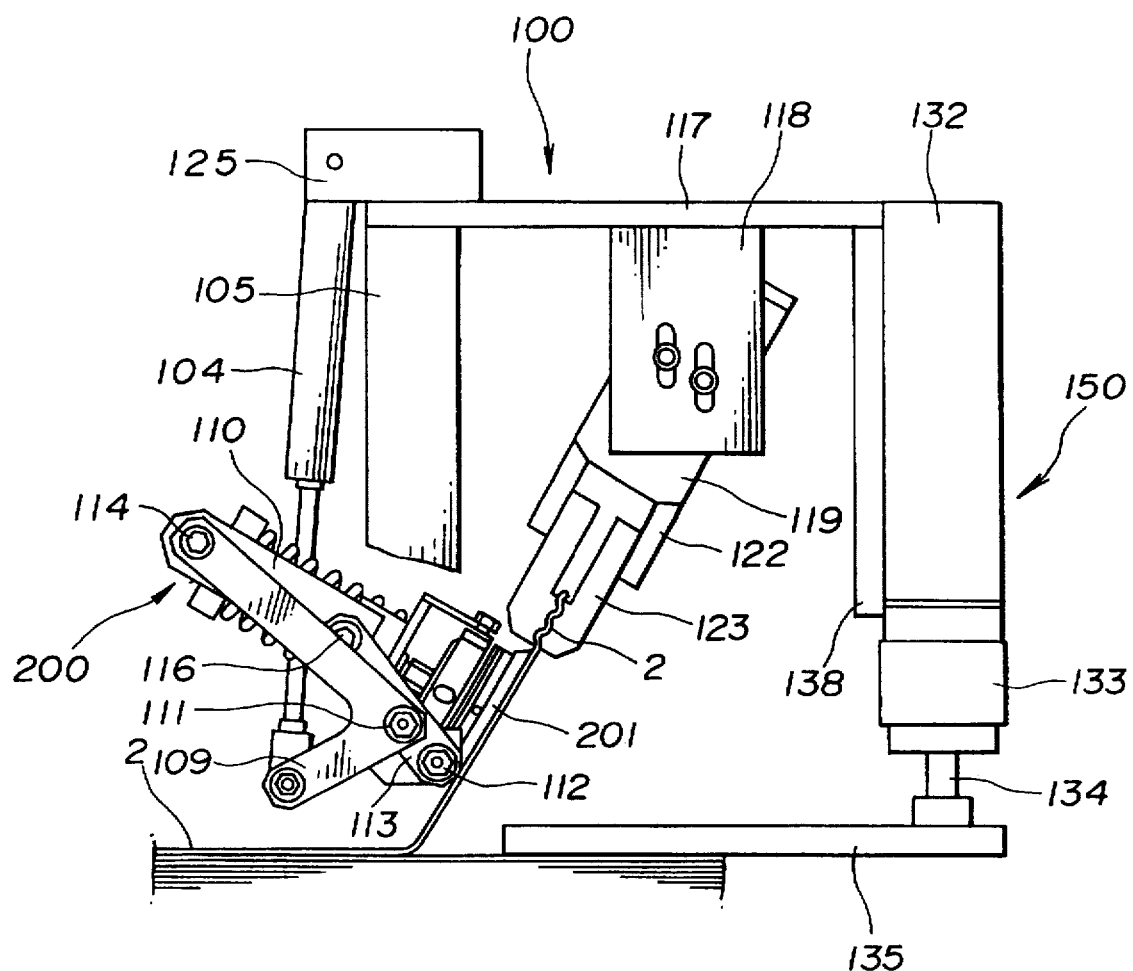
FIG. 5 is a side view for explaining usage of the film releasing device of FIG. 3.

As shown in FIG. 5, a pressuring mechanism 150 is installed to the film releasing device 100 to pressure next films 2 when a film 2 of a first order is grasped by the finger portions 123, 123. The pressuring mechanism 150 is constituted by a cylinder 132, a rotation cylinder 133, a piston rod 134 and a pressure plate 135. The cylinder 132 is installed to the upper support member 117 through a support member 138 so as to be parallel with the vertical support members 105. The piston rod 134 is connected to the cylinder 132 through the rotation cylinder 133 so as to vertically and rotatably move the pressure plate 135.

A film suction mechanism 200 is connected to the second link 110. As shown in FIGS. 8 to 11, the film suction mechanism 200 comprises a suction and 250 having a lip portion 201 made of rubber or flexible resin, such as urethane, silicon or nitorile rubber. The lip portion 201 is installed to an outer peripheral portion of an outer cup member 203. A pair of X-axis bearings 202, 202 are disposed at peripheries of the outer cup member 203 and opposite to each other while a center portion of the outer cup member 203 is disposed therebetween. An inner cup member 233 has a threaded portion 233A and is screwed to a threaded portion 203A of the outer cup member 203. A tube 204 extends from a vacuum source (not shown) to an inner vacuum chamber 206 formed at a center portion of the inner cup member 233. An end of the tube 204 is connected to the inner cup member 233 through connectors 204A and 205 to communicate the inner vacuum chamber 206 with the vacuum source. The inner and outer cup members 233 and 203 define an outer vacuum chamber 209 therebetween. The outer cup member 203 has a suction hole 208 through which the outer vacuum chamber 209 is communicated with the vacuum source by means of a tube 207 and a connector 207A. The outer vacuum chamber 209 is communicated with a bottom space through a cylindrical slit 212. The inner vacuum chamber 206 is communicated with the bottom space through a plurality of suction holes 211 of a bottom wall 210. A threaded portion 210A of the bottom wall 210 is screwed to a threaded portion 233B of the inner cup member 233. A partition plate 213 made of a resilient material is attached on a bottom surface of the inner cup member 233. A plurality of contact members 229 are attached on a bottom surface of the outer cup member 203. A plurality of contact plates 214 are attached on a bottom surface of the bottom wall 210. The contact members 229 and the contact plates define first grooves 238 and second grooves 237 through which air to be drawn is fed to the vacuum source. An outer ring 231 is screwed with an outer threaded portion 203B of the outer cup member 203 to sandwich a packing 215 between the outer ring 231 and a collar 232 of the outer cup member 203.

Figure 9:
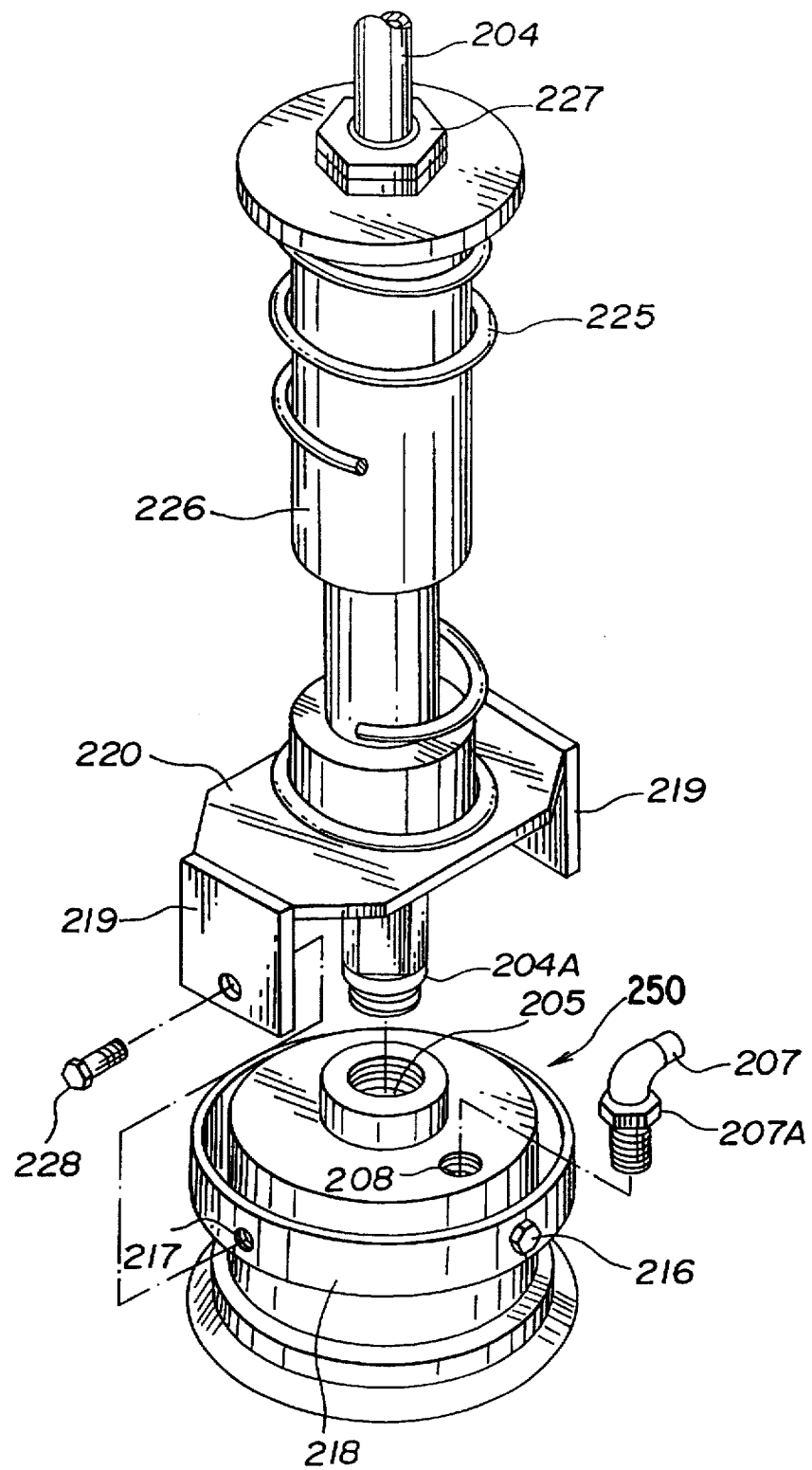
FIG. 9 is a perspective view of the film suction mechanism of FIG. 8.
Figure 10:
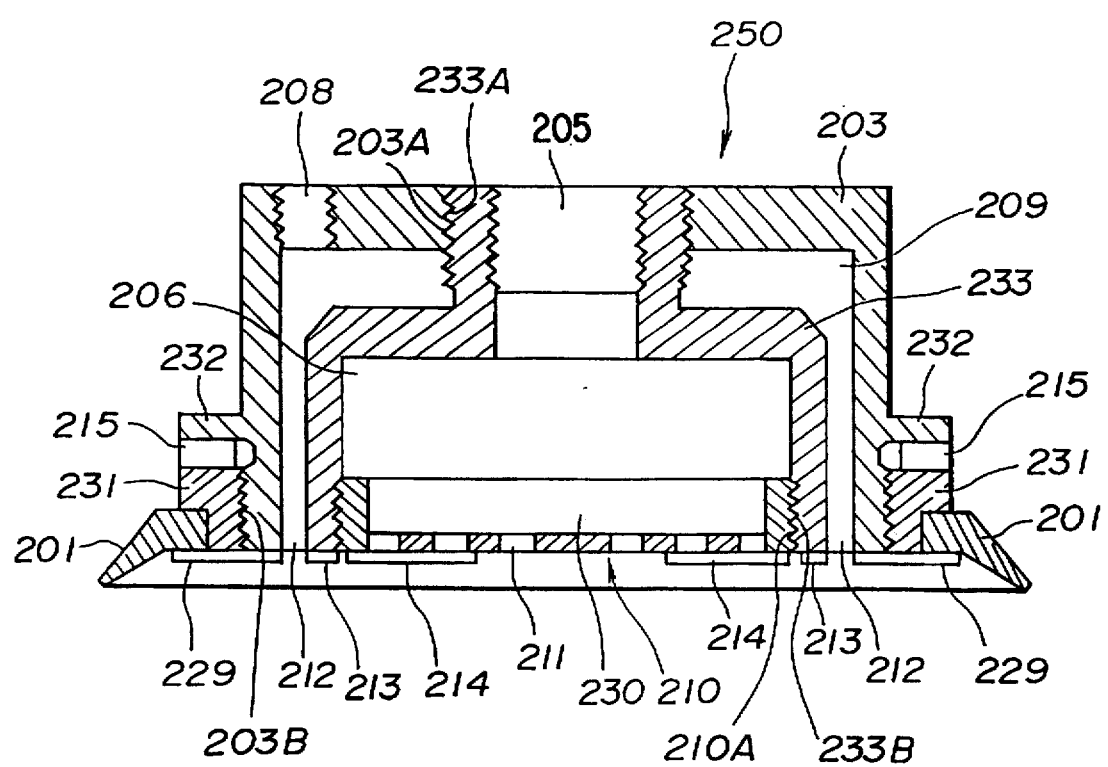
FIG. 10 is a partial sectional view of the film suction mechanism of FIG. 8.
Figure 11:
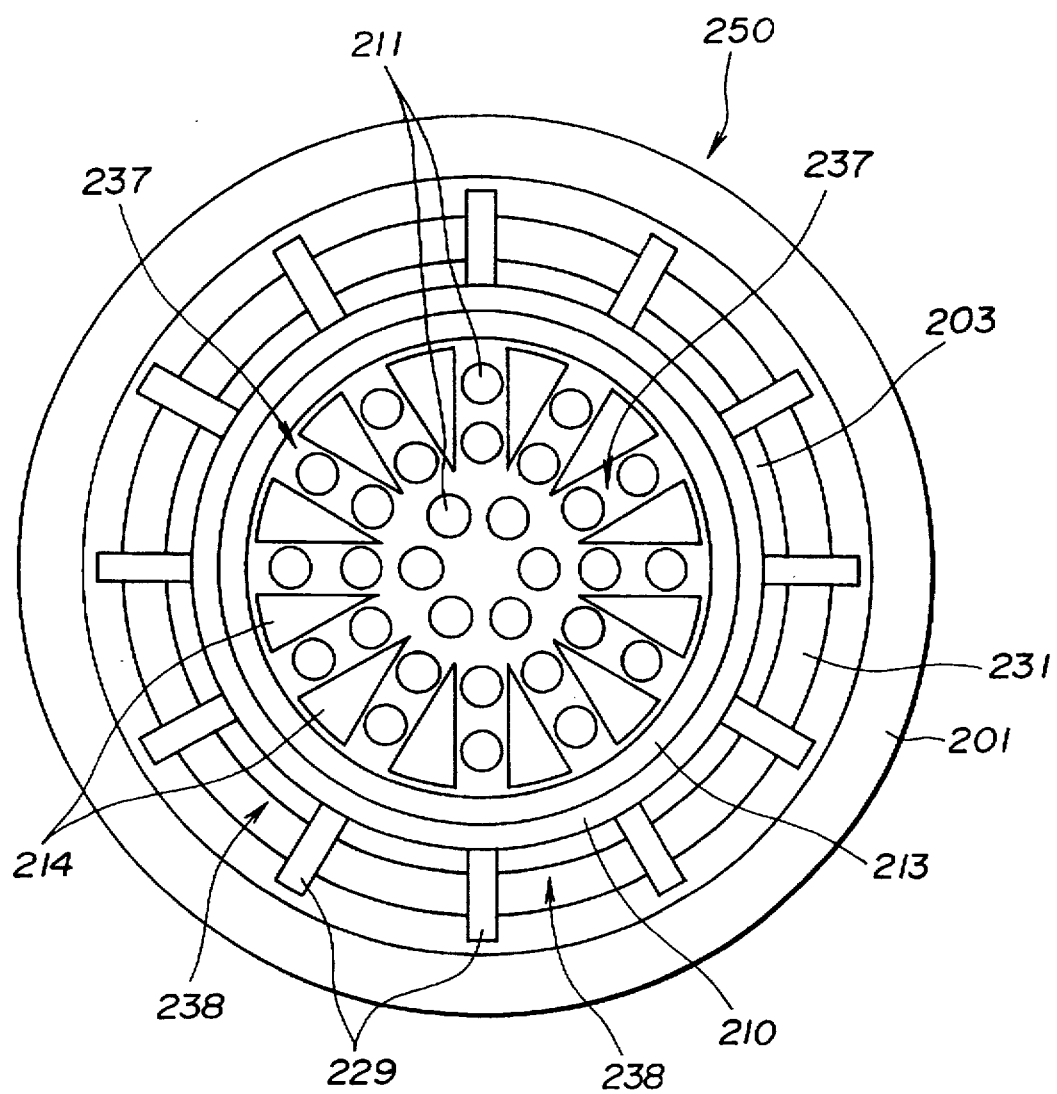
FIG. 11 is a bottom view of the film suction mechanism of FIG. 10.

A ring 218 is connected to the outer cup member 203. More particularly, a pair of X-axis shafts 216, 216 are interconnected with the pair of X-axis bearings 202, 202 of the outer cup member 203 so that the outer cup member 203 is rotatable on the X-axis shaft 216. The ring 218 has a pair of Y-axis bearings 217, 217 which are perpendicular to the X-axis bearings 202, 202 as shown in FIG. 9. The ring 218 is interconnected with a pair of brackets 219, 219 integral with a body member 223 by means of the Y-axis bearings 217, 217 and a pair of Y-axis shafts 228, 228. An upper portion of the body member 223 is formed into a threaded portion 221. A coil spring 225 is put between an installation member 226 and a base portion 220 of a body member 223. A clearance 222 is provided between the tube 204 and the body member 223. The installation member 226 has a cylinder bearing 224 through which the installation member 226 is slidable and in contact with the base member 220. A stopper 227 is screwed with the threaded portion 221 so as to bias the coil spring 225 between the base member 220 and the installation member 226. The installation member 226 is fixedly connected with the second link 110. Therefore, the film suction mechanism 200 is extensible and compressive along the second link 110. Further, the film suction mechanism 220 is swingable since the outer cup member 203 is rotatably connected to the ring 218 through the X-axis shaft 216 and the X-axis bearings 202 and the ring 218 is rotatably connected to the bracket 219 through the Y-axis shafts 228 and the Y-axis bearings 217.

In operation of the film suction mechanism 200, after the lip portion 201 is contacted with the film 2, air in a space defined by the film 2 and the film suction mechanism 200 is securely drawn to the vacuum source through the first and second grooves 237 and 238 and the inner and outer vacuum chambers 206 and 209 so as to hold the film 2. This air drawing operation is executed by turning-on solenoid valves (not shown) disposed in lines to the vacuum source. These solenoid valves are independently operable so as to be applicable to various films. Further, since the film suction mechanism 200 is arranged to be compressible in the axis direction and swingable in the X-axis and Y-axis, even if the surface of the film 2 is variously changed, the film suction mechanism 200 is fittingly put on the film 2 according to a surface condition of the film 2 and securely holds the film 2.

Figure 12:
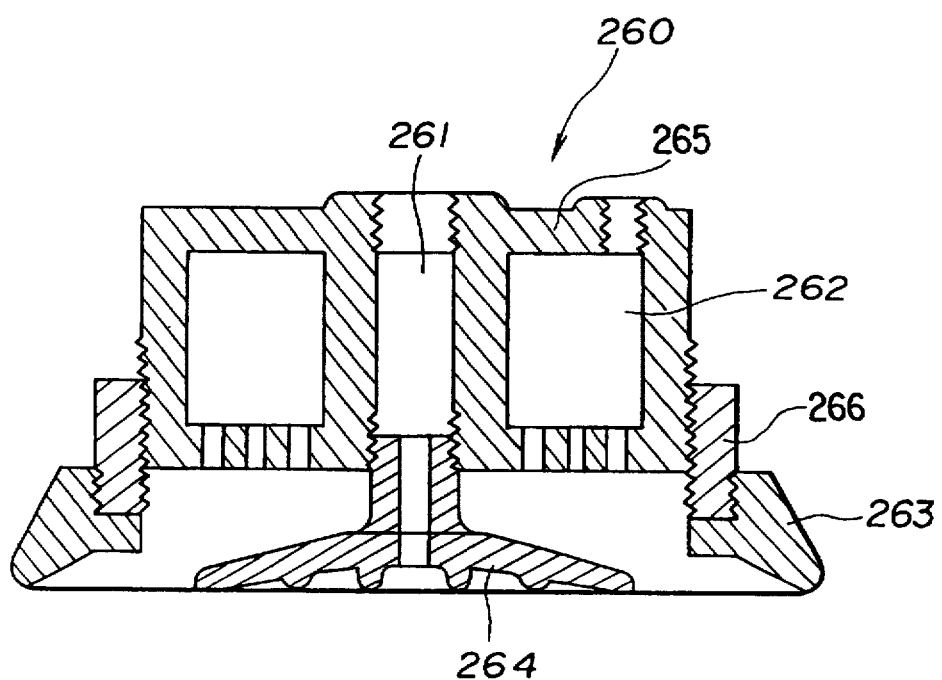
FIG. 12 is a sectional view of a modification of the film suction mechanism.

FIG. 12 illustrates another suction pad 260 which comprises an inner member 265 and an outer member 266 screwed with each other. The inner member 265 has a first vacuum chamber 261 and a second vacuum chamber 262. An inner pad 264 is screwed to the inner member 265. A lip portion 263 is screwed with the outer member 266. This suction pad 260 functions as is similar to the suction pad 250 mentioned above.

Figure 6:
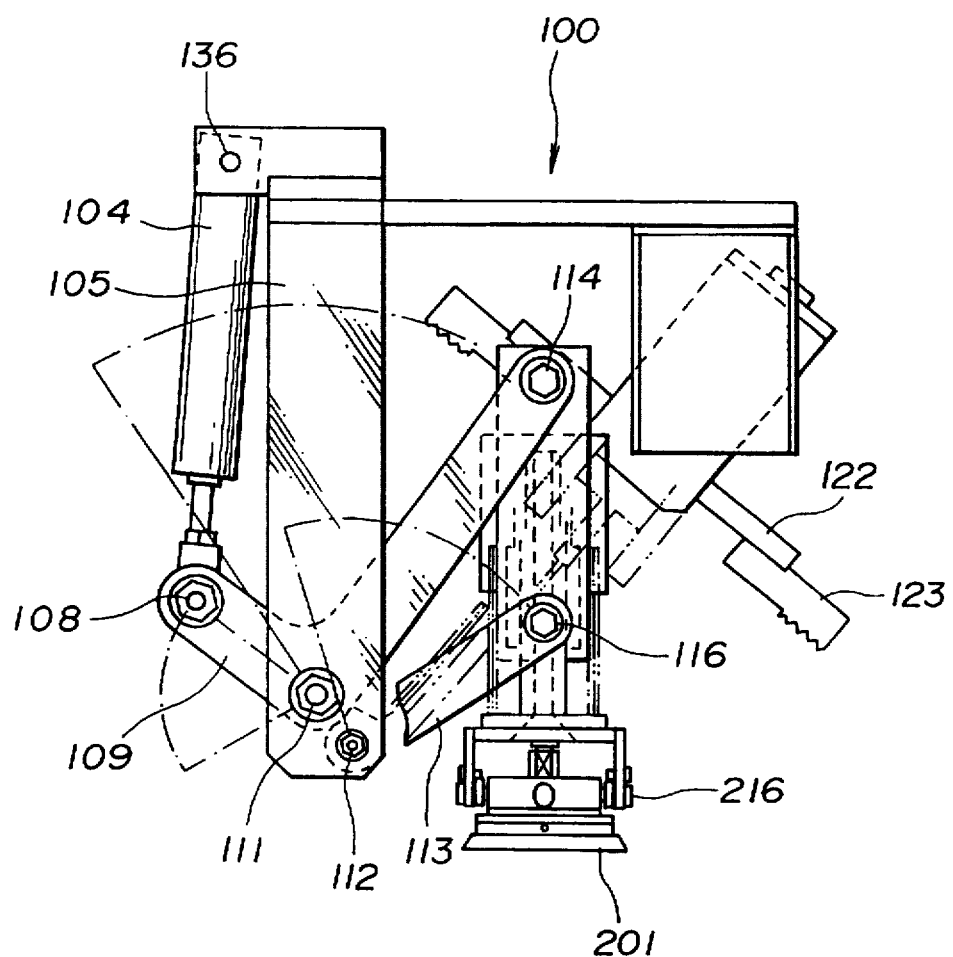
FIG. 6 is a side view for explaining movements of the film releasing device of FIG 3.
Figure 7:
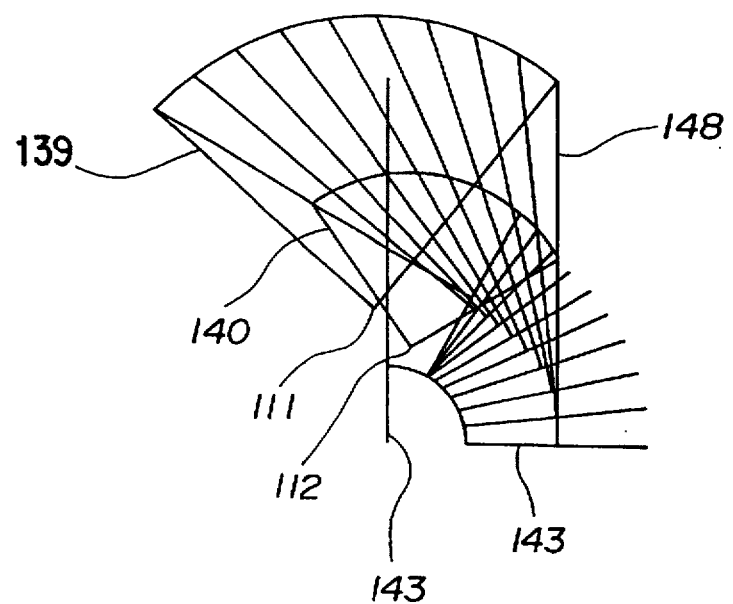
FIG. 7 is a view which shows loci of links and a film suction mechanism.
Figure 8:
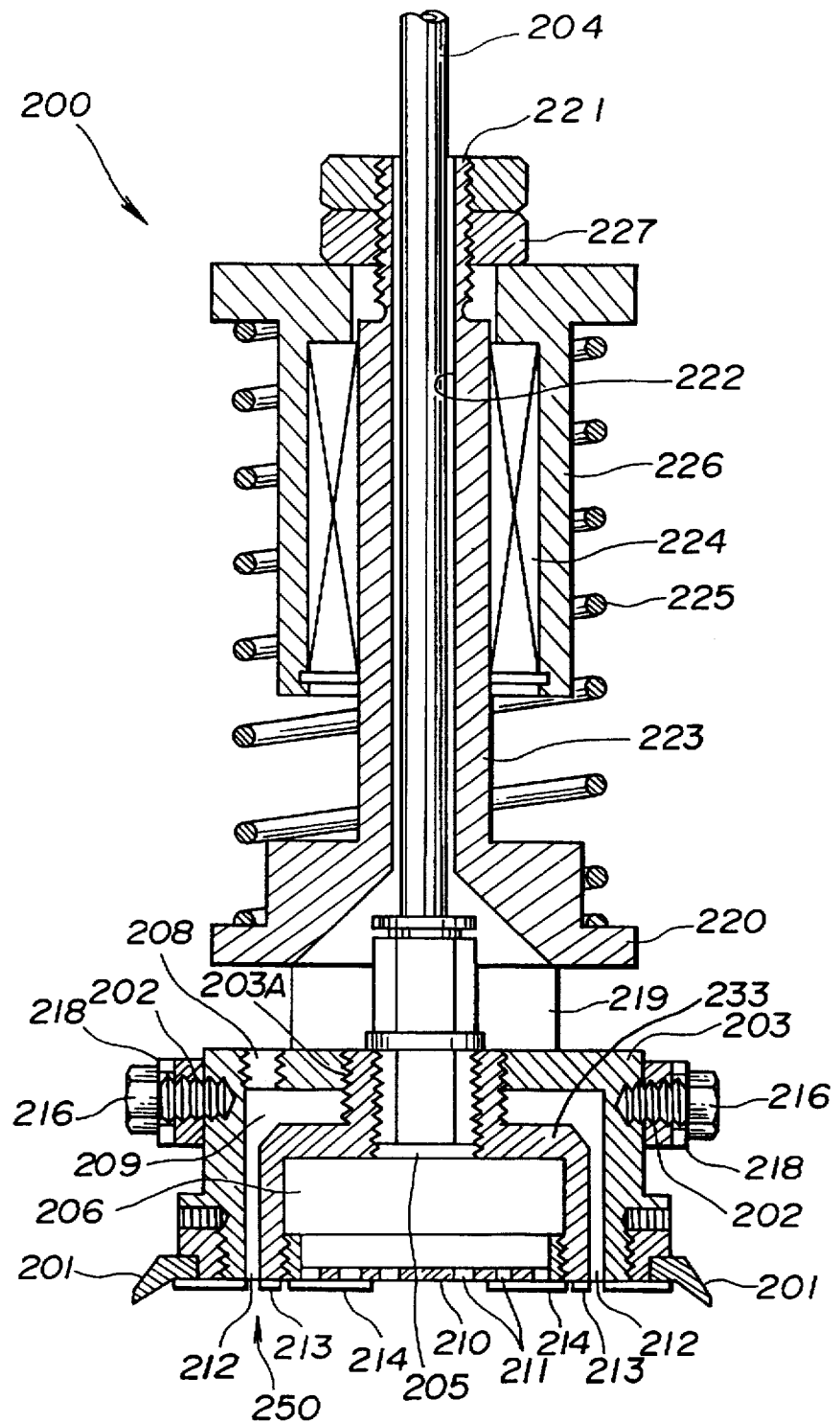
FIG. 8 is a sectional view of the film suction mechanism of the film releasing device.

The manner of a film releasing operation by the film releasing device 100 will be discussed hereinafter with reference to FIGS. 5, 6 and 7.

The first cylinder 104 rotatable on a support pin 136 is driven to push the first link 109. By this pushing operation, the first link 109 is swung on the shaft 111 to form a locus 139 as shown in FIG. 7, and the third link 113 is swung on the shaft 112 to form a locus 140 as shown in FIG. 7. Accordingly, the film suction mechanism 200 is inclined as indicated by the locus of the center axis, 148 in FIG. 7. Therefore, the suction surface 143 of the film suction mechanism 200 is inclined so that the suction surface 143 is located on an imaginary line of the center axis of the finger portions 123, 123. Then, the lifted end portion of the film 2 is grasped by the finger portions 123, 123.

Next, the procedures of a total film manipulating operation including a film transporting operation will be discussed hereinafter with reference to a time-chart of FIG. 13.

Figure 13:
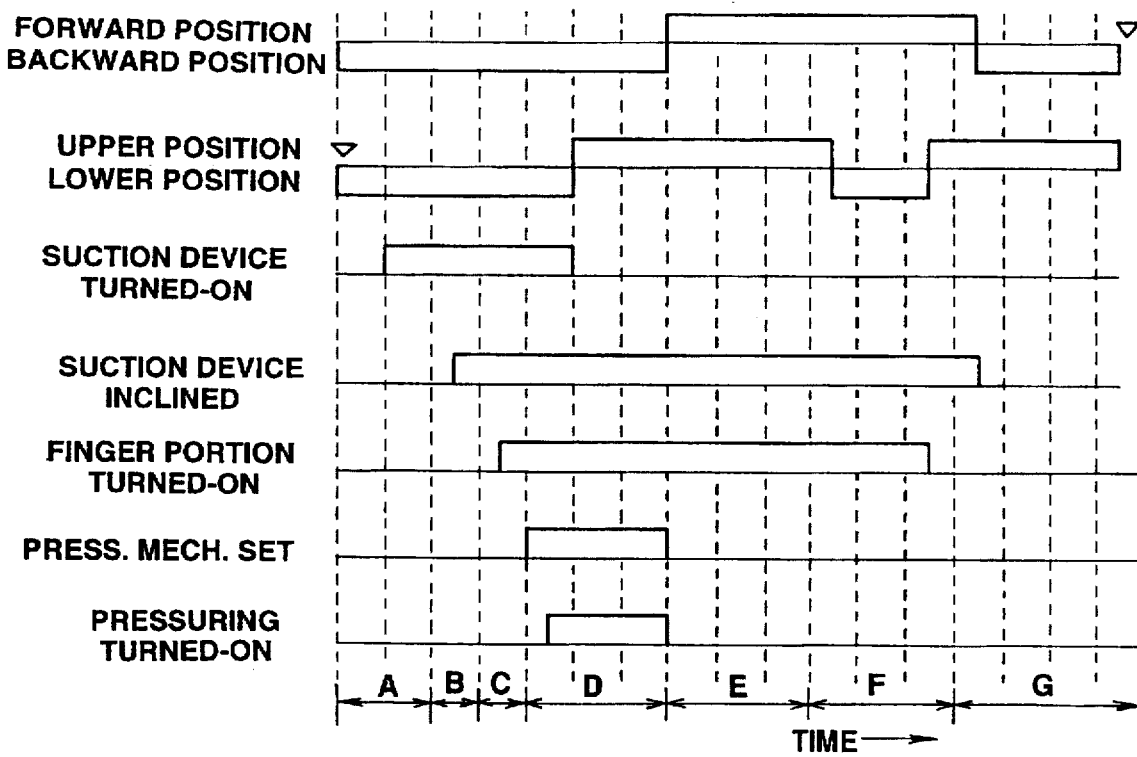
FIG. 13 is a time chart for explaining operations of the film manipulating apparatus according to the present invention.

At a left hand side mark ▽ in FIG. 13, the film manipulating apparatus 1 starts the film manipulating operations. The operations are executed as follows:

(1) the film handling device 10 is lowered in height level and the film suction device 200 holds a film 2 of a first order from stacked films 2, and this operation is executed during a period A in FIG. 13;

(2) the film suction mechanism 200 is inclined while holding or absorbing the film 2, and this operation is executed during a period B in FIG. 13;

(3) the finger portions 123, 123 grasp an end portion of the film 2, and this operation is executed during a period C in FIG. 13;

(4) the pressure plate 135 presses a film 2 of a second order together with the stacked films 2, the film handling device 10 is raised up with the film 2 of the first order, and this operation is executed during a period D in FIG. 13;

(5) the film handling device 10 is moved to a predetermined position above the table 303, and this operation is executed during a period E in FIG. 13;

(6) the film handling device 10 is lowered and releases the film 2 on the table 303, and this operation is executed during a period F in FIG. 13;

(7) the film 2 put on the table 303 is adjusted so as to be positioned at a standard position, and this operation is executed during the period F in FIG. 13; and (8) the film handling device 10 is returned to a start position of this film moving operation, and this operation is executed during a period G in FIG. 13.

These operations are repeatedly executed, and the stacked films on the table 48 are transported to the table 303 one by one.

Figure 14:
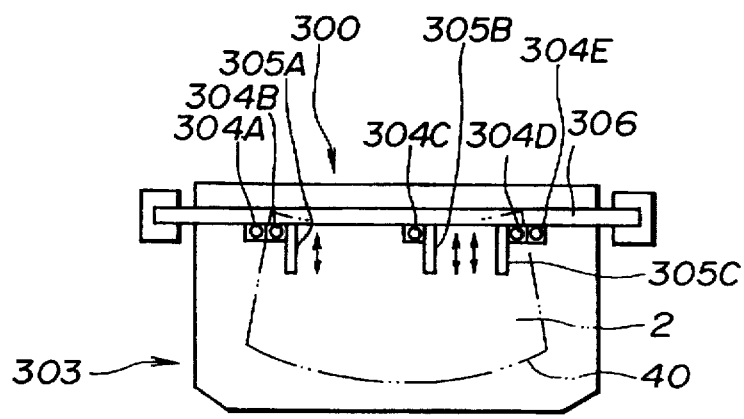
FIG. 14 is a top view of a film positioning device of the film manipulating apparatus according to the present invention.

As shown in FIG. 14, five cameras 304, such as CCD cameras are provided as a part of a film positioning system 300. First and second cameras 304A and 304B are disposed above the table 303 to scan a field around a left hand side edge of the film 2 and/or of a glass plate. A third camera 304C is disposed above the table 303 to scan a field around a center portion of an upper edge of the film 2 and glass plate in FIG. 18. Fourth and fifth cameras 304D and 304E are disposed above the table 303 to scan a field around the right hand side edge of the film 2 and/or of a glass plate. The first and second cameras 304A and 304B are installed to a first adjuster 305A so as to be adjustable in the upper and lower directions as viewed from a front side of FIG. 14. The third camera 304C is installed to a second adjuster 305B so as to be adjustable in the upper and lower directions as viewed from a front side of FIG. 14. The fourth and fifth cameras 304D and 304E are installed to a third adjuster 305C so as to be adjustable in the upper and lower directions as viewed from a front side of FIG. 14. The first, second and third adjusters 305A, 305B and 305C are fixedly connected to a frame 306. The first and second cameras 304A and 304B are respectively used in accordance with a size of the glass sheet or of a film. For example, in case that a glass plate 6 of a large-size is put on the table 303, the first camera 304A is used for scanning the field on the glass sheet 6. On the other hand, in case that a glass plate 7 of a small-size is put on the table 303, the second camera 304B is used for scanning a predetermined field on the glass plate 7. Similarly, the fourth and fifth cameras 304D and 304E are selectively used in accordance with the size of a glass sheet.

Figure 15:
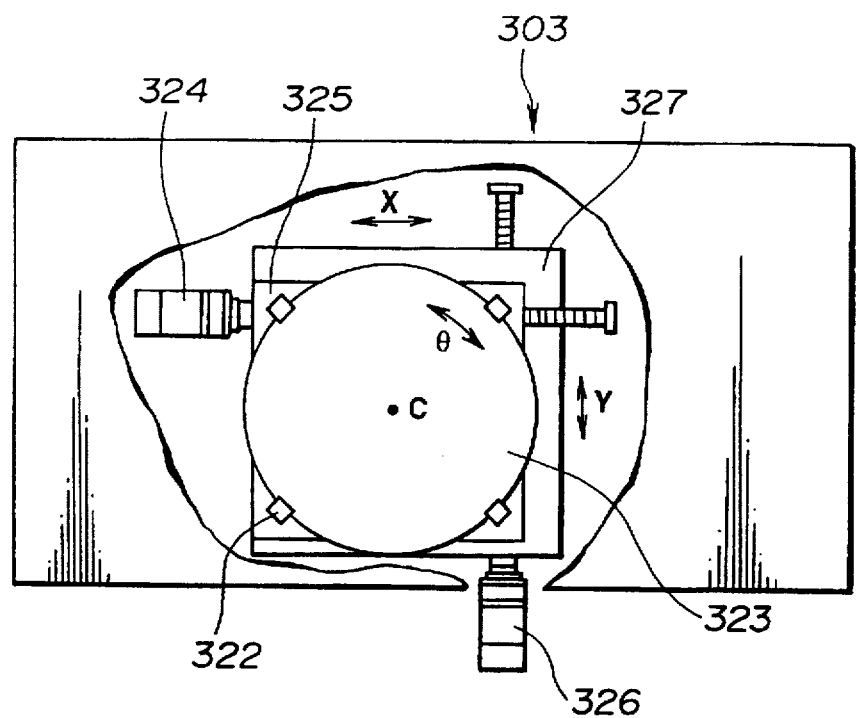
FIG. 15 is a top view, partially in cross-section, of a table for correcting the position of the film.
Figure 16:
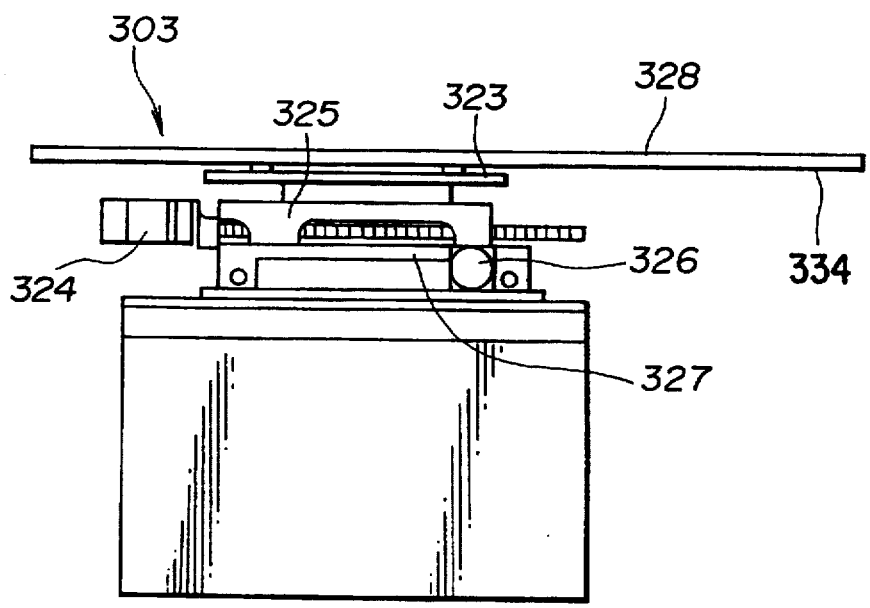
FIG. 16 is a side view of the table of FIG. 15.

As shown in FIGS. 15 and 16, the table 303 comprises a θ-axis table 323 which is rotated by a θ-axis drive motor (not shown) along four θ-axis guide bearings 322 so as to be rotated on a center axis C of the table 323 which is perpendicular to a sheet surface of FIG. 15. An X-axis table 325 is supportingly connected to the θ-axis table 323. The X-axis table 325 is driven by an X-axis drive motor 324 in the right and left direction in FIG. 15. A Y-axis table 327 is supporting connected to the X-axis table 325. The Y-axis table 327 is driven by a Y-axis drive motor 326 in the upper and lower direction in FIG. 15. A rectangular table 334 is connected to the θ-axis table 323. A net-like plate 328 is attached on the rectangular table 334. The thus arranged table 303 is connected to a control system for adjusting the position of the film 2 as will be mentioned in the next paragraph. The table 303 is driven by an AC servo-drive system of a feed screw type. Further, the temperature on a surface of the table 303 is controlled within 15°–50° C.

Figure 17:
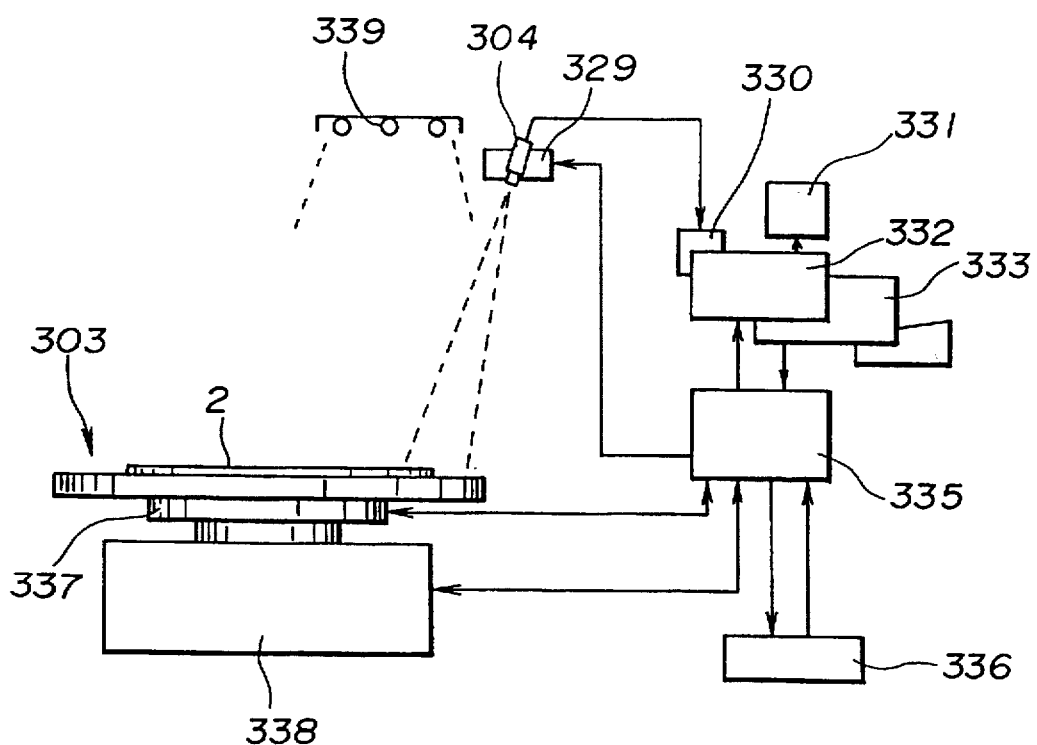
FIG. 17 is a schematic system view of a film positioning device of FIG. 14.

As shown in FIG. 17, the film 2 on the table 303 is illuminated by an illumination device 339, such as a fluorescent lamp. A camera-position adjusting section 329 is connected to each camera 304 to adjust a position of each of five cameras 304A to 304E. The cameras 304A to 304E generate signals from images of fields of a center portion and both side peripheral portions. The signals from the cameras 304A to 304E are sent to an image processing section 332 including a monitoring section 331 through a controlling section 330. The image processing section 332 processes the signals from the cameras 304A to 304E. A calculating section 333 connected to the image processing section 332 compares the signals indicative of the images from the image processing section 332 with a standard signal indicative of a standard position of the film, and outputs a signal indicative of a position correction value which indicates an offset amount of the film 2 on the table 303 with respect to the standard position. A control section 335 receives the signal indicative of the position correction value from the calculating section 333 and outputs a drive signal for correcting the position of the film to the image processing section 332. Further, the control section 335 outputs a signal indicative of the accomplishment of a positioning of the film 2 to a film transportation control section 336. The control section 335 receives a signal indicative that the transportation of the film has ended. The control section 335 outputs a signal to the camera position adjusting section 329 in order to adjust the positions of the cameras 304A to 304E. The control section 335 outputs a motor drive signal and a position reset signal to the θ-axis drive section 337. The control section 335 receives a signal indicative that θ-axis correction has been accomplished. Further, the control section 335 outputs a motor drive signal and a position reset signal to the X-Y axis drive section 338. The control section 335 receives a signal indicative that X-Y axis correction has been accomplished from the X-Y axis drive section.

Figure 18:
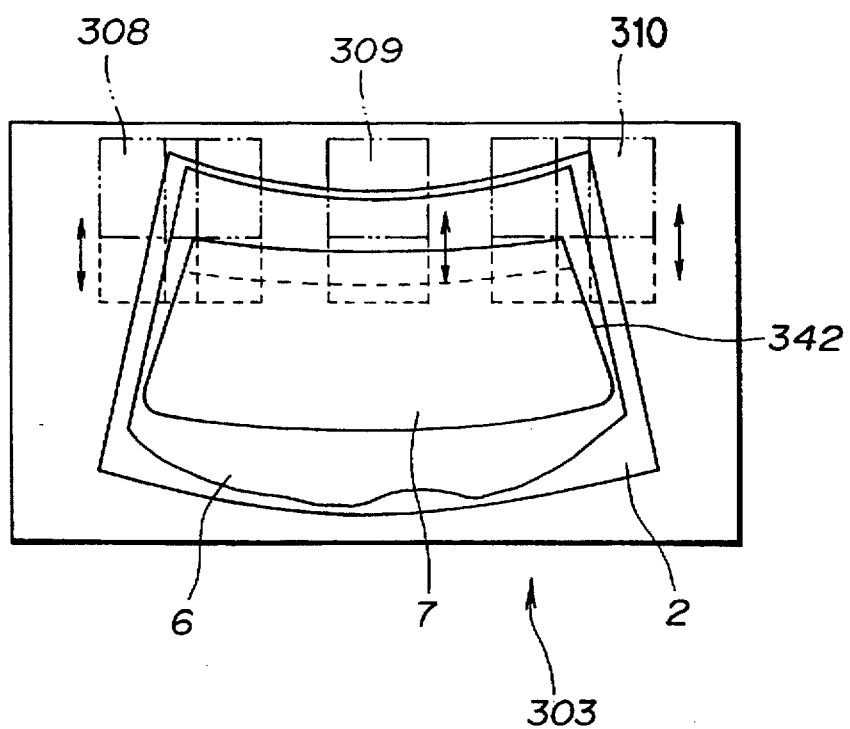
FIG. 18 is a top view which shows a relationship among a sheet glass, a film and a camera visual field.
Figure 19:
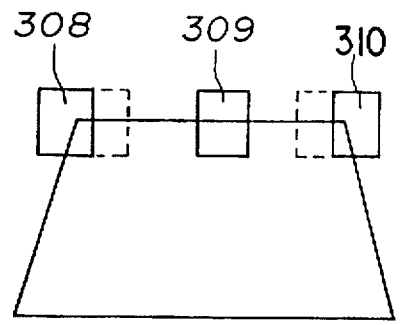
FIG. 19 is a view for explaining the relationship between the film and the image field of the camera.

As shown in FIGS. 18 and 19, a sheet of film 2 is put on the table 303, and the maximum-size glass plate 6 or minimum-size glass plate 7 is put thereon. In order to adapt the film 2 to various sizes of glass plates, the first and second cameras 304A and 304B monitor a first field 308, the third camera 304C monitors a second field 309, and the fourth and fifth cameras 304D and 304E monitor a third field 310.

Figure 20:
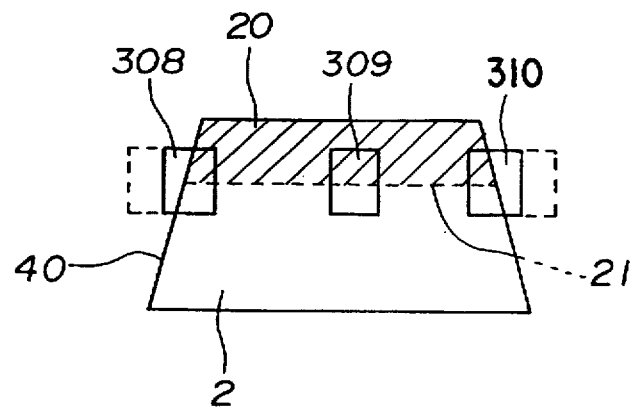
FIG. 20 is a view for explaining the relationship between the film with a banded-gradation and the image field of the camera.

If a film 2 with a banded-gradation portion 20 is manipulated by this apparatus, the cameras 304A to 304E are arranged to monitor a boundary 21 of the banded-gradation portion 20 in the film 2 as shown in FIG. 20.

The film positioning system 300 executes a position detection of the film 2 as follows.

Figure 21:
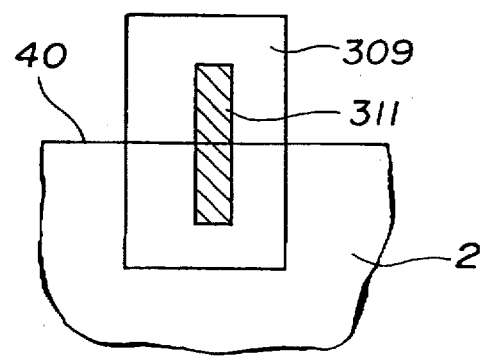
FIG. 21 is an enlarged view of a center portion of the image field in FIG. 19.

As shown in FIG. 21, a predetermined area in the second field 309 monitored by the third camera 304C is set as a window 311 where brightness on its surface is detected.

Figure 22:
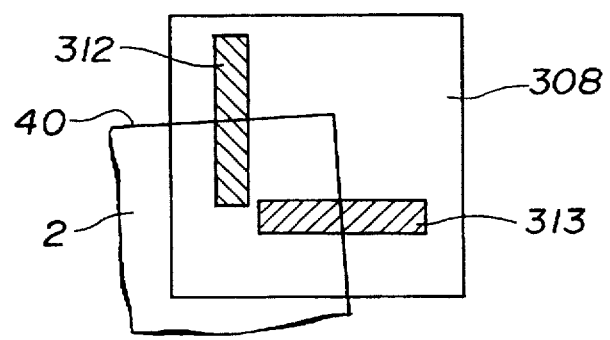
FIG. 22 is an enlarged view of a side portion of the image field in FIG. 19.

More particularly, the edge 40 of the film 2 is detected from a difference between the brightness of a surface of the table 303 and the brightness of a surface of the film 2. Further, the positions of both corners are detected by obtaining a position of the upper edge and a position of the side edge 40 from data of brightness in windows 312 and 313 as shown in FIG. 22. Two lines indicative of the upper edge 40 and the side edge 40 of the film 2 are obtained by analyzing the brightness data. That is, by selecting the data including a brightness as the same as that of the edge in each window 312, 313 and by analyzing a position distribution of the selected data, the lines are obtained. Further, the corner is indicated as an intersection of the lines.

Figure 23:
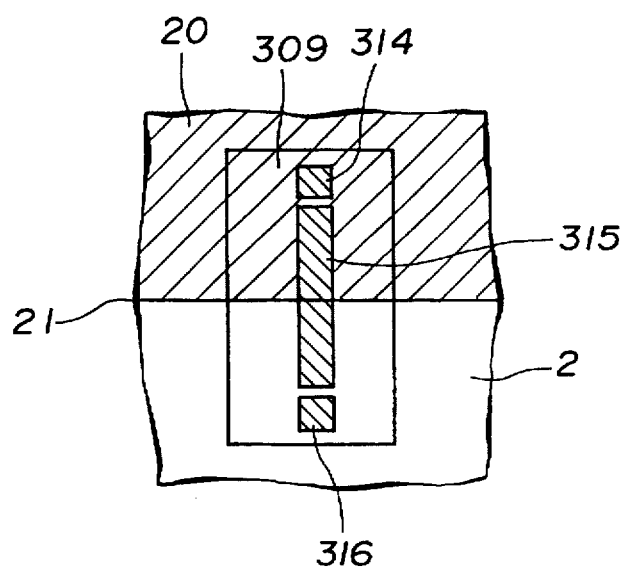
FIG. 23 is an enlarged view of a center portion of the image field in FIG. 20.

FIG. 23 shows windows 314, 315 and 316 for detecting a boundary 21 of a banded-gradation portion 20 in the film 2. After the film 2 is disposed on the table 303 so that the boundary 21 of the banded-gradation portion 20 is located in the window 315, data indicative of an average brightness at the gradation portion 20 is detected at the window 314, and data indicative of an average brightness at a transplant portion of the film 2 is detected at the window 316. On the basis of the data obtained at windows 314 and 316, a brightness value corresponding to the brightness of the boundary 21 is calculated. Next, by selecting the data including brightness as the same as the calculated value and by analyzing a position distribution of the selected data, the line indicative of the boundary 21 is obtained therefrom.

Figure 24:
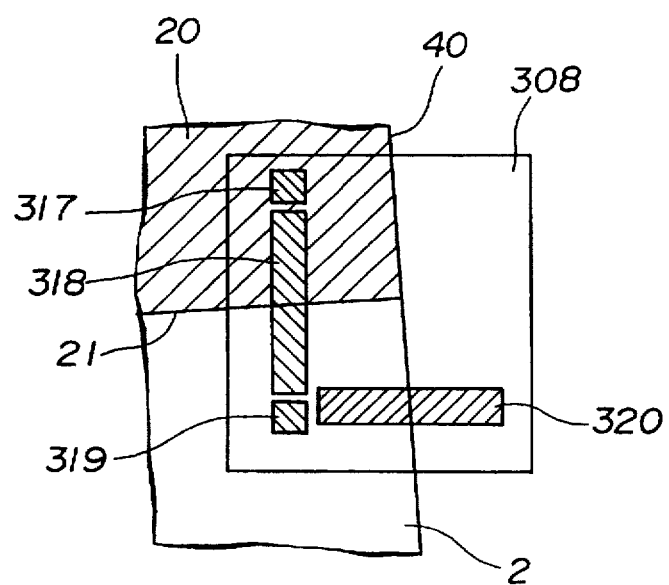
FIG. 24 is an enlarged view of a side portion of the image field in FIG. 20.

FIG. 24 shows windows 317, 318, 319 and 320 for detecting an intersection between a boundary 21 of a banded-gradation portion 20 in the film 2 and a side edge 40 of the film 2. After the film 2 is disposed on the table 303 so that the boundary 21 of the banded-gradation portion 20 is located in the window 318, data indicative of an average brightness at the gradation area is detected at the window 317, and data indicative of an average brightness at a transplant portion of the film 2 is detected at the window 319. On the basis of the data obtained at windows 314 and 316, a brightness value corresponding to the brightness of the boundary is calculated. Next, by selecting the data including brightness as the same as the calculated value and by analyzing a position distribution of the selected data, the line indicative of the boundary 21 is obtained therefrom. Further, the edge 40 of the film 2 is detected from a difference between the brightness of a surface of the table 303 and the brightness of a surface of the film 2. On the basis of the line indicative of the boundary 21 of the banded-gradation portion 20 and the line indicative of the edge 40 of the film 2, an intersection thereof is calculated.

Figure 25A:
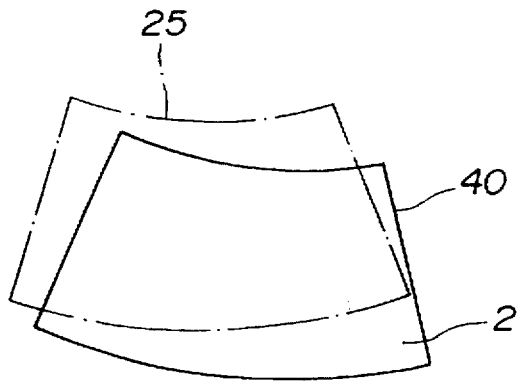
FIG. 25A, 25B and 25C are views for explaining position correcting procedures of the film on a table.

The method for setting the film 2 at a predetermined position will be discussed with reference to FIGS. 25A to 25C.

First, the film 2 is put on the table 303 without fine position adjusting. Therefore, the position of the film 2 is offset from a standard position 25 which is previously determined as shown in FIG. 25A. The film positioning device (mechanism) 300 calculates and offset amount of the film 2 with respect to the standard position from the signals obtained by the cameras 304A to 304E. That is, the offset amounts of the θ-axis, the X-axis and the Y-axis are respectively calculated as a correction value.

Figure 25B:
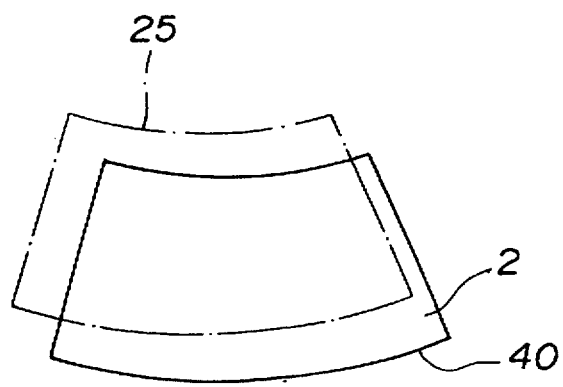
Figure 25C:
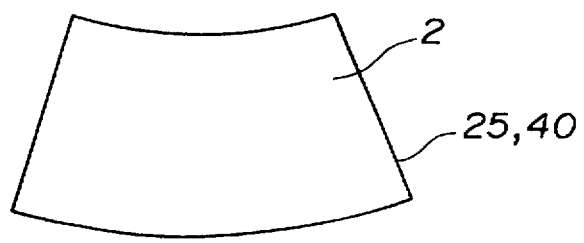

Next, the correction of the θ-axis is executed for the film 2 by rotating the table 303 according to the calculated correction value for the film 2, as shown in FIG. 25B. Further, the correction of the X-Y axis is executed by moving the table 303 according to the calculated correction value as to the X-Y axis to adjust the film 2 to the standard position as shown in FIG. 25C.

Figure 26A:
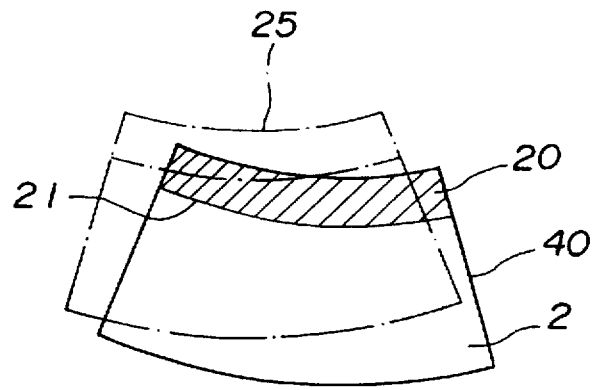
FIG. 26A, 26B and 26C are views for explaining position correcting procedures of the film with a banded-gradation on a table.
Figure 26B:
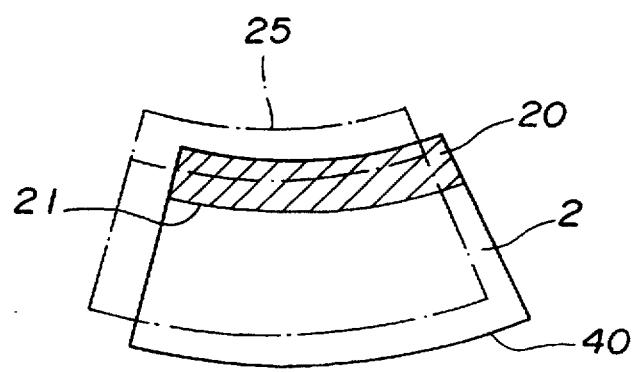
Figure 26C:
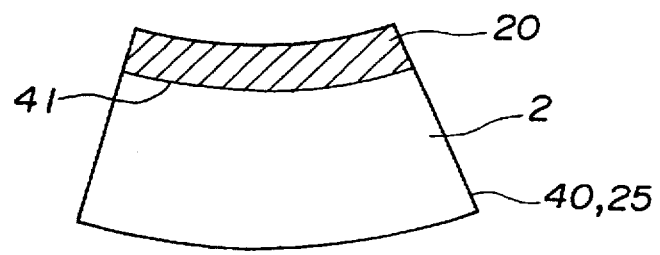

In case of a film 2 with a banded-gradation portion 20, in stead of the upper edge 40 of the film 2, a boundary 21 of the banded-gradation portion 20 is used for the position detection as mentioned in the explanation of FIGS. 23 and 24. As is similar to the above-mentioned case, the position correction of the film 2 is executed by controlling the table 303 by the control section 335. That is, the film 2 with the banded-gradation portion 20 is put on the table 303 without fine position adjusting, as shown in FIG. 26A. The film positioning mechanism 300 calculates offset amounts of the film 2 with respect to the standard position from the signals obtained by the cameras 304A to 304E. Next, the correction of the θ-axis is executed for the film 2 by rotating the table 303 according to the calculated correction value for the film 2, as shown in FIG. 26B. Further, the correction of the X-Y axis is executed by moving the table 303 according to the calculated correction value as to the X-Y axis to adjust the film 2 to the standard position as shown in FIG. 26C.

With the thus arranged film manipulating apparatus, a film is released one by one from stacked films without being degraded in quality, and is transported to a predetermined position with fine accuracy. Furthermore, since this apparatus can be controlled at a desired temperature, it is applicable to various kinds of films which tend to change its properties according to a temperature or humidity. This enables the operations by this apparatus to be efficiently executed.

Figure 27:
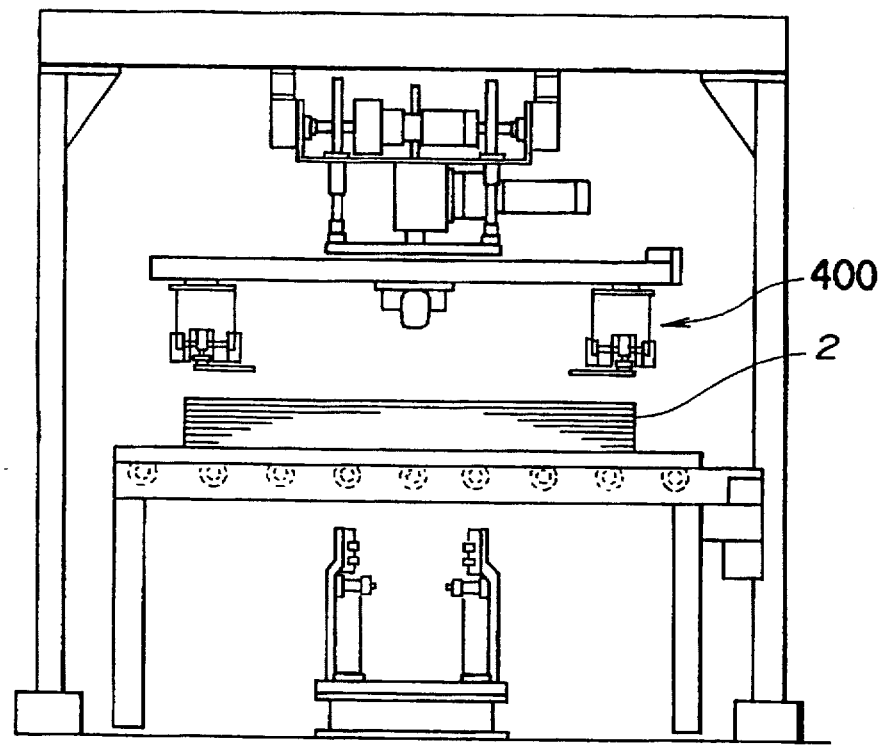
FIG. 27 is a side view of a second embodiment of the film manipulating apparatus according to the present invention.
Figure 28:
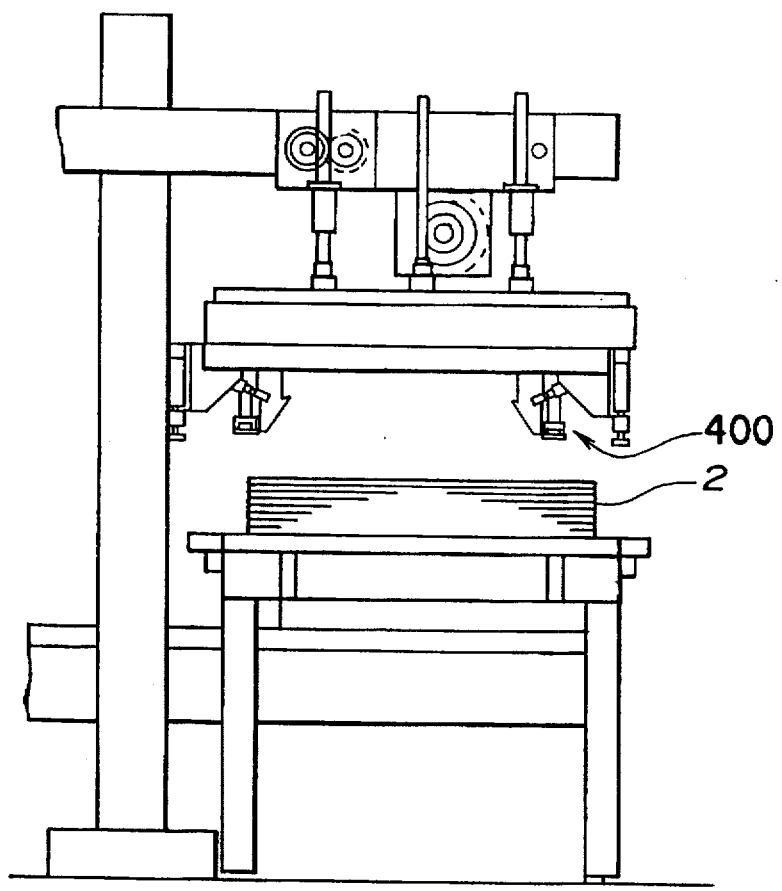
FIG. 28 is a side view of the second embodiment.
Figure 29:
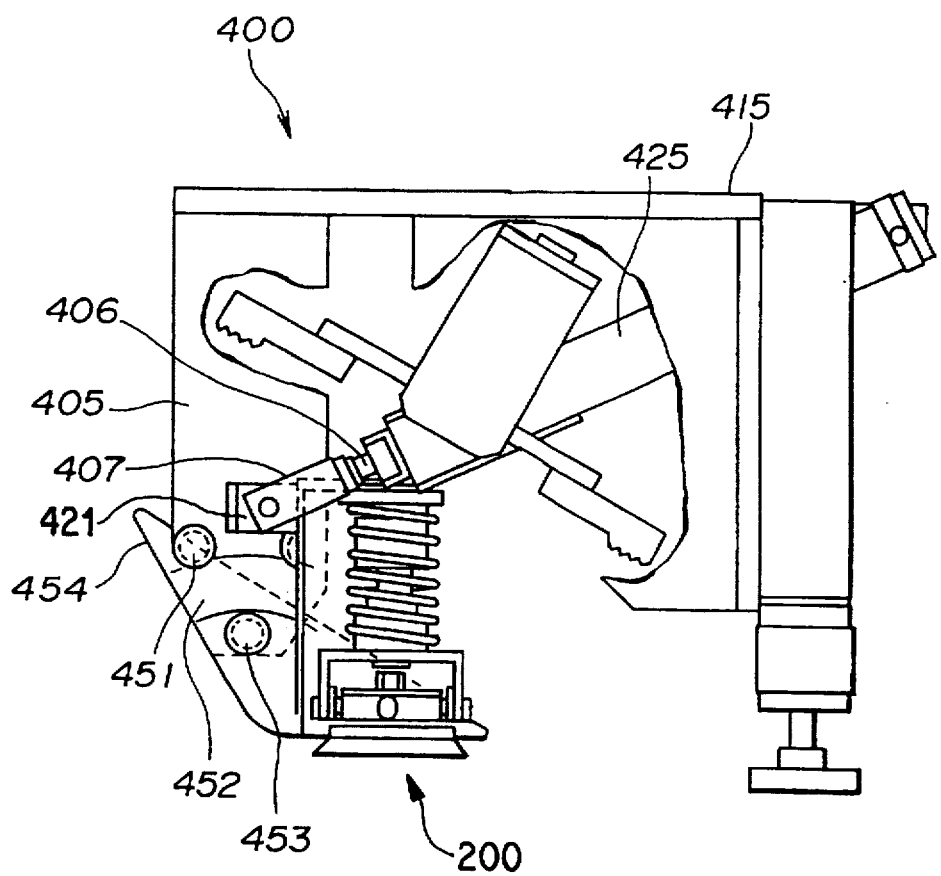
FIG. 29 is side view of the film handling device of the second embodiment.

FIGS. 27 to 29 illustrate a second embodiment of the film manipulating apparatus 1 according to the present invention. The construction of the second embodiment is generally the same as that of the first embodiment except for the structure of a film releasing device. That is, the film releasing device 400 of the second embodiment comprises a pair of vertical support members 405, 405 and an upper support member 415 which is integrally connected to the vertical support members 405, 405 An end of a first air cylinder 425 is rotatably connected to a bracket connected to the upper support member 415. A rod end member 407 is connected to the other end of the first air cylinder 425 through a piston rod 406. The rod end member 407 is rotatably connected to a bracket 421 fixed to the film suction device 200. Furthermore, the film suction device is connected to a support cover 454 which is integrally connected with a guide rail 452. The guide rail 452 is slidably put between first and second guide roller sets 451 and 453 which are supported to the vertical supporting members 405, 405. Therefore, the film suction mechanism 200 is inclined according to the pushing operation of the first air cylinder 425. Since the other construction of the second embodiment is the same as that of the first embodiment, the explanation thereof is omitted herein.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A method of manipulating a particular film of a plurality of stacked films comprising the steps of:

attaching suction devices to at least two opposite peripheral portions of the particular film;

grasping ends of the peripheral portions of the particular film;

lifting the suction devices so that the peripheral portions approach a center of the particular film;

pressuring remaining stacked films of said plurality of stacked films with a vertically and rotatably movable pressure plate;

further lifting the particular film to release the particular film from the remaining stacked films;

transporting and putting the particular film on a predetermined portion; and keeping at least one of a temperature and a humidity of the particular film in a predetermined condition.

2. The method as claimed in claim 1, wherein the particular film is made of synthetic resin.

3. The method as claimed in claim 1, wherein the particular film is one of a glass sheet and a glass film whose thickness is smaller than 1.5 mm.

4. The method as claimed in claim 1, wherein the particular film includes a banded-gradation portion and is formed in one of a sector-shape and a trapezoid-shape.

5. The method as claimed in claim 1, wherein attached portions of the particular film correspond to four corner portions of the particular film, and further comprising the step of lifting the film by the suction devices along the direction of a diagonal line of the particular film.

6. A method of manipulating a particular film of a plurality of stacked films comprising the steps of:

attaching suction devices to at least two opposite peripheral portions of the particular film;

grasping ends of the peripheral portions of the particular film;

lifting the suction devices so that the peripheral portions approach a center of the particular film;

pressuring remaining stacked films of said plurality of stacked films;

further lifting the particular film to release the particular film from the remaining stacked films;

transporting and putting the particular film on a predetermined portion; and applying the particular film as an intermediate film for a laminated glass sheet.

7. A method of manipulating a particular film of a plurality of stacked films comprising the steps of:

attaching suction devices to at least two opposite peripheral portions of the particular film;

grasping ends of the peripheral portions of the particular film;

lifting the suction devices so that the peripheral portions approach a center of the particular film;

pressuring remaining stacked films of said plurality of stacked films;

further lifting the particular film to release the particular film from the remaining stacked films;

transporting and putting the particular film on a predetermined portion;

adjusting a position of the particular film to the predetermined portion by obtaining image data of at least two edge portions of the particular film;

comparing the image data with a preset standard value; and correcting the position of the particular film according to a difference between the image data and the preset standard value.

8. The method as claimed in claim 7, wherein correcting the position of the particular film is executed by correcting the position in θ-axis rotation, X-axis displacement and Y-axis displacement.

9. The method as claimed in claim 7, and further comprising the step of putting the particular film on a table whose surface is covered with a net-like member which generates a brightness different from that of the particular film.

10. The method as claimed in claim 7, wherein the particular film includes a banded-gradation portion and adjusting said position is executed by obtaining image data of at least two intersections between a boundary of the banded-gradation portion and edge portions of the particular film.

11. The method as claimed in claim 10, wherein correcting the position of the film is executed by correcting the position in θ-axis rotation, X-axis displacement and Y-axis displacement.

* * * * *